United States Patent [19]
McCloskey

[11] 3,876,265

[45] Apr. 8, 1975

[54] ANTI-FRICTION BALL BEARING ASSEMBLY

[75] Inventor: Albert R. McCloskey, Fairfield, Conn.

[73] Assignee: Rockwell International Corporation, Pittsburgh, Pa.

[22] Filed: Sept. 24, 1973

[21] Appl. No.: 399,954

[52] U.S. Cl. .................. 308/6 C; 308/26; 308/184; 308/189 R; 308/238
[51] Int. Cl. ............................................ F16c 17/00
[58] Field of Search ............. 308/6 A, 6 B, 6 C, 26, 308/184, 189 R

[56] References Cited
UNITED STATES PATENTS

| 163,083 | 5/1875 | Knock | 308/6 B |
|---|---|---|---|
| 1,152,680 | 9/1915 | Wieselgreen | 308/26 |
| 2,081,237 | 5/1937 | Jantsch | 308/26 |
| 2,193,549 | 3/1940 | Chamberlin | 308/184 R |
| 2,465,785 | 3/1949 | Berno | 308/26 |
| 2,738,240 | 3/1956 | Parsons | 308/26 |
| 3,107,946 | 10/1963 | Drake | 308/26 |
| 3,203,202 | 8/1965 | Brownyer | 308/6 B |
| 3,382,017 | 5/1968 | Cripe | 308/26 |
| 3,608,985 | 9/1971 | Swanson | 308/6 C |
| 3,672,734 | 6/1972 | Bando | 308/26 |

Primary Examiner—Manuel A. Antonakas
Assistant Examiner—Daniel J. O'Connor

[57] ABSTRACT

An anti-friction ball bearing assembly, adapted for mounting within a housing comprising an outer sleeve and an inner sleeve concentrically fitting within said outer sleeve, said inner sleeve having a central opening for the passage of a shaft therethrough, said inner sleeve having a number of tracks defining paths for the circulation of balls between said sleeves and said shaft during movement between said shaft and said bearing assembly, said balls, during a portion of their circulation path, contacting said shaft and the inner surface of said outer sleeve at a plurality of raceway surfaces provided thereon, said outer sleeve having a recessed area, a resilient liner disposed in said recessed area between said anti-friction ball bearing assembly and said housing to accommodate misalignment between said housing and said shaft.

7 Claims, 1 Drawing Figure

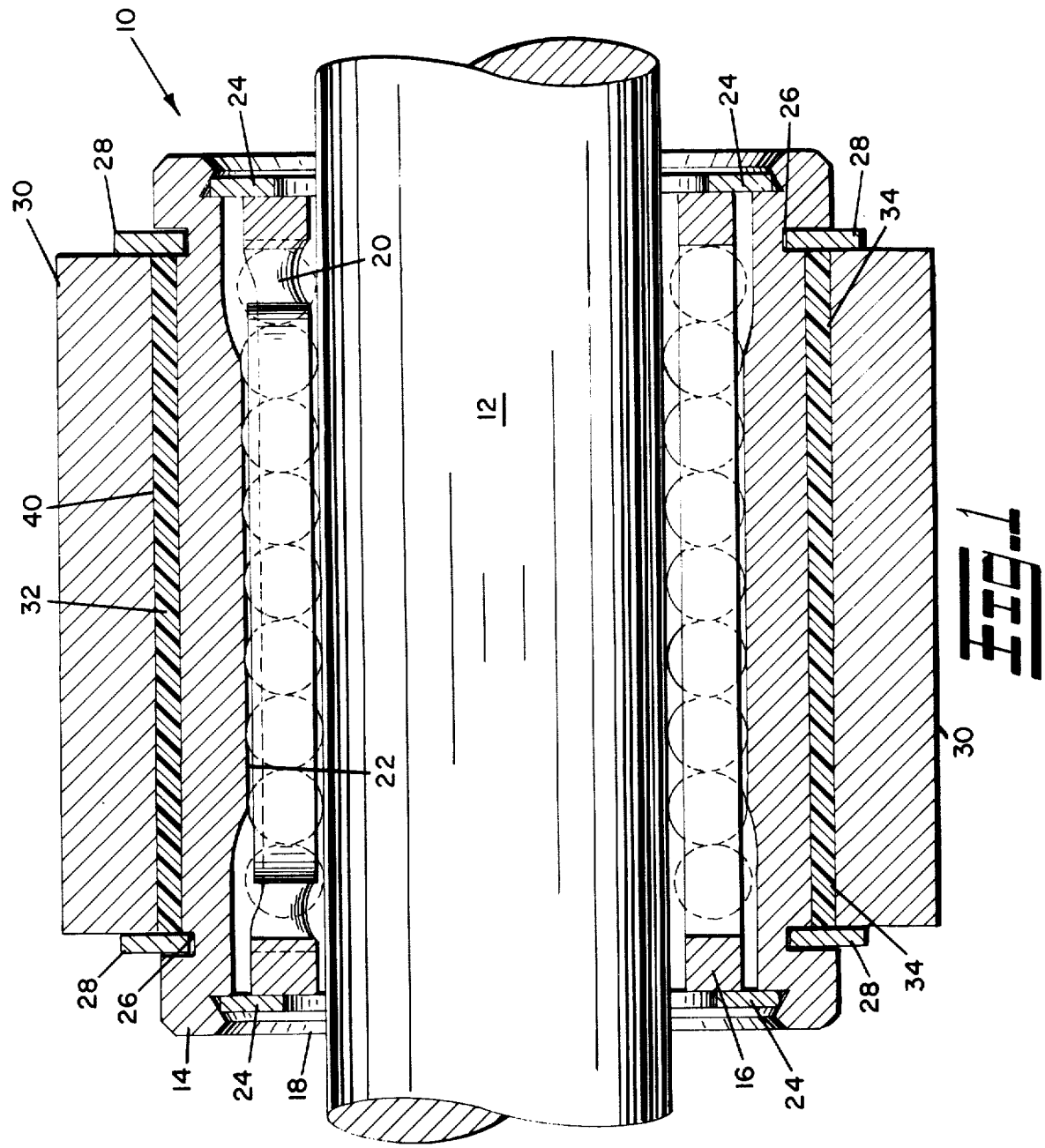

ANTI-FRICTION BALL BEARING ASSEMBLY

BACKGROUND OF THE INVENTION

This invention relates to a ball bearing assembly adapted to move longitudinally along a circular shaft. In particular, the invention relates to a anti-friction ball bearing assembly, adapted for mounting within a housing comprising an outer sleeve and an inner sleeve concentrically fitting within said outer sleeve, said inner sleeve having a central opening for the passage of a shaft therethrough, said inner sleeve having a number of tracks defining paths for the circulation of balls between said sleeves and said shaft during movement between said shaft and said bearing assembly, said balls, during a portion of their circulation path, contacting said shaft and the inner surface of said outer sleeve at a plurality of raceway surfaces provided thereon, having a recessed area, a resilient liner disposed in said recessed area between said anti-friction ball bearing assembly and said housing to accommodate misalignment between said housing and said shaft.

The prior art is replete with recirculating ball bearing assemblies. Typical prior art forms of bearings of this type are subject to high rates of wear between their respective parts.

One of the primary causes of premature wear in linear ball bearing assemblies can be directly related to misalignment of the shaft with respect to the housing in which the linear bearing is placed. A small degree of misalignment will cause binding of the shaft with respect to the various recirculating balls, and this binding will cause scoring of the balls, the shaft and the various raceway surfaces upon which the balls are supported in their loaded state.

The prior art has attempted to accommodate this misalignment by utilizing intricate and expensive designs which are at best only marginally successful.

SUMMARY OF THE INVENTION

Accordingly, it is a primary object of this invention to provide an anti-friction ball bearing assembly, adapted for mounting within a housing comprising an outer sleeve and an inner sleeve concentrically fitting within said outer sleeve, a shaft therethrough, said inner sleeve having a number of tracks defining paths for the circulation of balls between said sleeves and said shaft during movement between said shaft and said bearing assembly, said balls, during a portion of their circulation path, contacting said shaft and the inner surface of said outer sleeve at a plurality of raceway surfaces provided thereon, said outer sleeve having a recessed area, a resilient liner disposed in said recessed area between said anti-friction ball bearing assembly and said housing to accommodate misalignment between said housing and said shaft.

It is another object of this invention to provide an anti-friction ball bearing assembly which is particularly adapted to accommodate mechanical misalignment of the shaft with respect to the housing in which the bearing is mounted, the mechanical misalignment being of the type that is primarily caused by mounting and fabrication inaccuracies in the overall bearing system.

It is still another object of the present invention to provide a highly efficient ball bearing assembly which is capable of being inexpensively manufactured and being simplistic in design.

It is still another object of the present invention to provide an anti-friction ball bearing assembly which can be used with "standard catalog housings," therefor obviating the need for extra and external accessories.

It is still another object of the present invention to provide an anti-friction ball bearing assembly which can be manufactured using high volume automated techniques.

It is yet another object of the present invention to provide an anti-friction ball bearing assembly which can accommodate certain dynamic misalignments.

Other objects of the present invention and details of the structure of the anti-friction ball bearing assembly will appear more fully from the following description and accompanying drawings.

DESCRIPTION OF THE DRAWINGS

FIG. 1 is a side elevational view partially cut away of an anti-friction ball bearing assembly mounted on a shaft embodying the concept of the present invention.

DETAIL DESCRIPTION OF THE INVENTION

Referring now to the drawing, that is FIG. 1, there is shown an improved anti-friction ball bearing assembly embodying the concept of the present invention wherein the anti-friction ball bearing assembly is generally designated by the numeral 10. The anti-friction ball bearing assembly 10 is particularly adapted for being mounted, for linear translation thereon, on a shaft 12. The anti-friction ball bearing assembly 10 is provided with an outer sleeve 14 and an inner sleeve 16. The outer surface of the inner sleeve 16 may be polyhedronal in shape and may have a number of axially extending planar surfaces (not shown).

The inner sleeve 16 is further provided with a number of closed loop tracks 18 which define paths with circulation of load carrying balls 20. The inner surface of the outer sleeve 14 may also be polyhedronal in shape. The inner surface of the outer sleeve 14 has a number of axially extending planar surfaces. The shape of the inner surface of the outer sleeve 14 generally conforms to the shape of the outer surface of the inner sleeve 16. The outer surface of the inner sleeve 16 therefor may be placed in registration with the inner surface of the outer sleeve at their respective axially extending planar surfaces.

A plurality of axially extending bearing raceways 22 are provided on the inner surface of the outer sleeve 14.

The retaining means such as snap rings 24 are provided at each end of the anti-friction ball bearing assembly 10 to positionally anchor the inner sleeve 16 in the outer sleeve 14 to thereby maintain the operational integrity of the anti-friction ball bearing assembly 10. The snap rings 24 therefor maintain the axial position of the inner sleeve 16 with respect to the outer sleeve 14 while the aforementioned registration of the axially extending planar surfaces of the inner sleeve 16 and the outer sleeve 14 maintain the radial position of the inner sleeve 16 with respect to the outer sleeve 14.

The outer surface of the outer sleeve 14 generally embodies and contains the critical departure from the prior art forms of linear bearings.

The outer surface of the outer sleeve 14 is provided with annular grooves 26. These annular grooves 26 are adapted to receive retaining means such as snap rings 28.

The snap rings 28 axially position the anti-friction ball bearing assembly 10 within housing 30. The housing 30, which is substantially cylindrical in shape, is the means by which the anti-friction ball bearing assembly 10 is operationally connected to a machine element device, apparatus or the like such as a tooling fixture, etc. (not shown). The housing 30 (or sometimes referred to in industry as a bushing) is attached to such machine element, etc., by an appropriate attaching means (not shown) such as a set screw, press fit or the like. A typical example of housings 30 can be found in ROCKWELL INTERNATIONAL CORPORATION'S catalog LB-2. These products are marketed under ROCKWELL INTERNATIONAL CORPORATION'S trademark UNILIN.

The outer surface of the outer sleeve 14 is also provided with an annular recess 32. The inner surface 40 of the housing 30 is typically cylindrical in shape and has a diameter substantially equal to, or slightly larger, than the original outside diameter of the outer surface 34 of the outer sleeve 14.

A cylindrical resilient liner 34 is disposed within the annular recess 32 and provides a resilient operational "cushion" between the housing 30 and the anti-friction ball bearing assembly 10. The liner 34 may be interposed between the housing 30 and the ball bearing assembly in a relaxed state, partially preloaded state, or in a heavily preloaded state; depending upon application of operational environment.

The misalignment that is typically encountered in static misalignment, that is, misalignment built into the system as for example that misalignment which may be caused by an improperly aligned shaft. The rotation of the housing 30 with respect to the anti-friction bearing assembly 10 and the shaft 12 will also accommodate certain degrees of dynamic misalignment such as may be caused by different loading vectors.

It should be noted that the accommodation of static and dynamic misalignment forces is achieved by the present invention without any special accessories, parts or the like and utilizes off-the-shelf components such as standard housings 30.

The cylindrical resilient liner 34 therefor may serve the function of accommodating multi-directional static and dynamic loads caused by different forms of misalignment.

The cylindrical resilient liner 34 may also serve the dual function of electrically isolating the anti-friction ball bearing assembly 10 from the housing. This could be done by providing an annular lip (not shown) at each end of the liner 34 upon which the retaining rings 28 could act to maintain the axial position of the anti-friction ball bearing assembly 10 with respect to the housing 30. Also, retaining rings manufactured from plastic or other suitable non-conductive materials could be used to position the housing 30 and the bearing 10.

The cylindrical resilient liner 34 could be manufactured from a wide variety of materials depending upon the various operational parameters. For example, the liner 34 could be manufactured from rubber or plastic. An example of the latter material would be suitable molded olefin copolymers or polystyrenes and the like.

It is therefor, obvious, that the present invention is not to be limited to the specific details as herein described, but is capable of other modifications and changes without departing from the spirit and scope of the appended claims.

I claim:

1. An anti-friction ball bearing assembly in combination with a housing, said bearing assembly to be fitted and mounted in said housing, said bearing assembly comprising an outer sleeve and an inner sleeve concentrically fitting within said outer sleeve, said inner sleeve having a central opening for the passage of a shaft therethrough, said inner sleeve having a number of tracks defining paths for the circulation of balls between said sleeves and said shaft during movement between said shaft and said bearing assembly, said balls, during a portion of their circulation path, contacting said shaft and the inner surface of said outer sleeve at a plurality of raceway surfaces provided thereon, said outer sleeve having a recessed area, a resilient liner disposed in said recessed area between said anti-friction ball bearing assembly and said housing to accommodate misalignment between said housing and said shaft.

2. An anti-friction ball bearing assembly in accordance with claim 1, in which said resilient liner is manufactured from a resilient plastic.

3. An anti-friction ball bearing assembly in accordance with claim 1, in which said resilient liner is manufactured from rubber.

4. An anti-friction ball bearing assembly in accordance with claim 1, in which said anti-friction ball bearing assembly is positionally mounted within said housing, said position in said housing being maintained by retaining rings, said resilient liner having radially extending lips at each end thereof abutting said rings to electrically isolate said anti-friction ball bearing assembly from said housing.

5. An anti-friction ball bearing assembly in accordance with claim 1, in which said resilient liner is in a relaxed state between said anti-friction ball bearing assembly and said housing.

6. An anti-friction ball bearing assembly in accordance with claim 1, in which said resilient liner is in a pre-loaded state between said anti-friction ball bearing assembly and said housing.

7. An anti-friction ball bearing assembly in accordance with claim 1, in which said anti-friction ball bearing assembly is positionally mounted within said housing, said position in said housing being maintained by retaining rings, said retaining rings being manufactured from a electronically non-conductive material to electrically isolate said anti-friction ball bearing assembly from said housing.

* * * * *